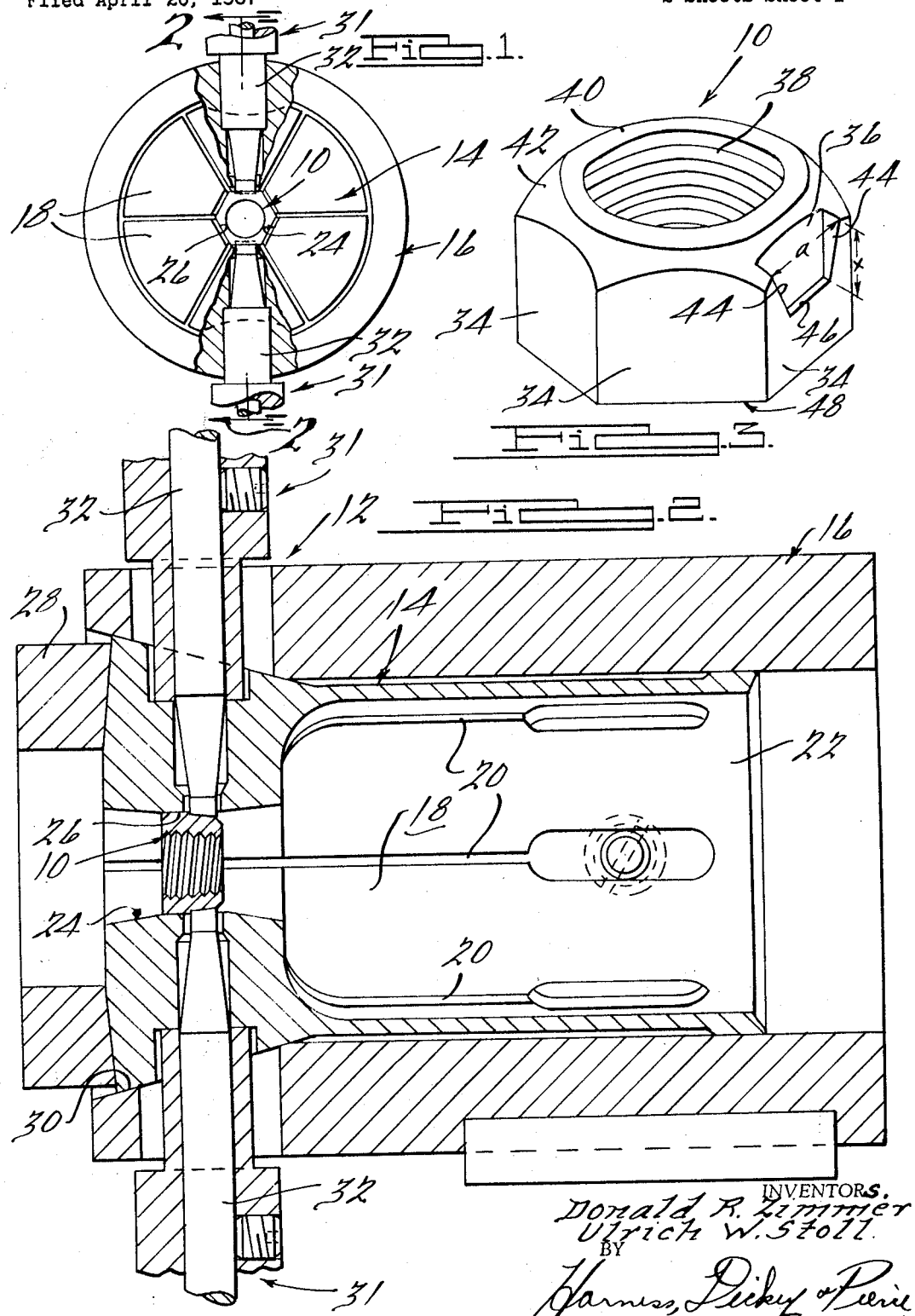

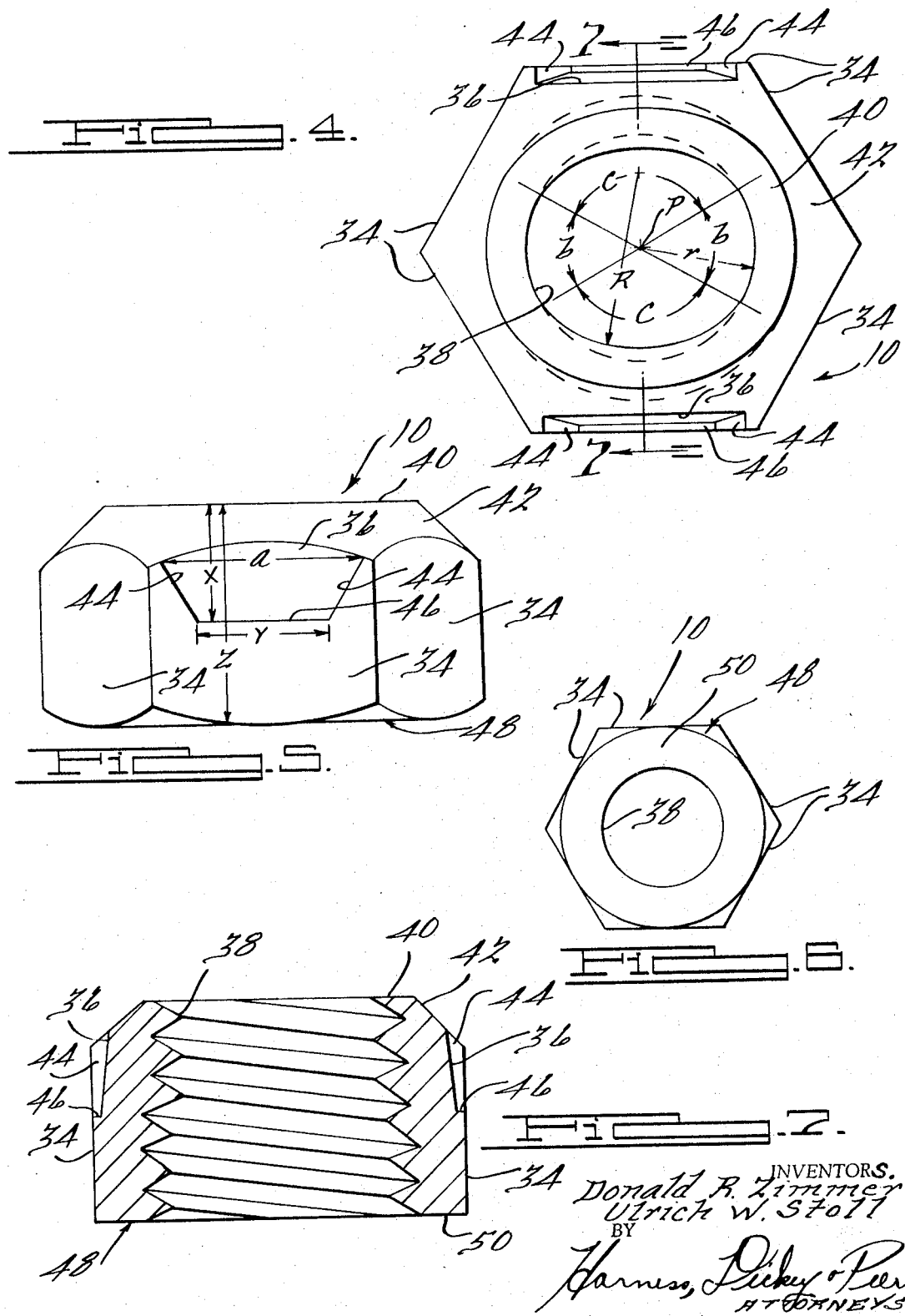

United States Patent Office 3,455,361
Patented July 15, 1969

3,455,361
TORQUE NUT
Donald R. Zimmer, Detroit, and Ulrich W. Stoll, Ann Arbor, Mich., assignors to Zimmer-Lightbody Industries, Inc., Detroit, Mich., a corporation of Michigan
Filed Apr. 20, 1967, Ser. No. 632,443
Int. Cl. B21d *53/24;* F16b *39/22*
U.S. Cl. 151—21                    15 Claims

ABSTRACT OF THE DISCLOSURE

A torque nut having indented flanks and of a construction with desirable dimensional characteristics. The indented flanks comprising a pair of opposed flats on the nut having indentations adjacent their upper ends with a resulting inward deformation of the nut threads in the areas of said indentations. The portions of the threads in quadrature with the deformed portions being undeformed and being located a distance from the nut axis equal to the radius of the undeformed nut bore.

Summary background of the invention

The present invention relates to torque nuts and more particularly to a novel torque nut having a novel indentation construction. The torque nut of the present invention is of the type having selected portions of the threaded bore deformed; it has been found that by selective location of the areas of deformation improved torque and torque retaining characteristics can be realized. Therefore the torque nut of the present invention has the adjacent pairs of flats defining equal included angles. In addition the torque nut has the threaded bore deformed only in the area proximate the indentations in select ones of the flats such that portions of the bore in quadrature with the indentations remain generally undeformed with these undeformed portions being located a distance from the nut axis substantially equal to the undeformed bore radius.

Therefore it is an object of the present invention to provide a novel torque nut of the above described type in which adjacent pairs of the flats define equal included angles; it is another object to provide an improved torque nut in which portions of the bore in quadrature with the indentations in the flats are undeformed and are located a distance from the nut axis substantially equal to the undeformed bore radius.

It is an object of the present invention to provide a torque nut of a new and improved construction.

Description of the drawings

FIGURE 1 is an end elevational view of indenting apparatus for indenting a torque nut;

FIGURE 2 is a sectional view, to increased scale, of the apparatus of FIGURE 1, taken generally along the line 2—2;

FIGURE 3 is a pictorial view, to increased scale, of the novel torque nut of the present invention;

FIGURE 4 is a top view of the torque nut;

FIGURE 5 is a side view of the torque nut;

FIGURE 6 is a bottom view, to reduced scale, of the torque nut; and

FIGURE 7 is a sectional view of the torque nut taken generally along the line 7—7 in FIGURE 4.

The novel torque nut of the present invention can be made on apparatus of the type shown in the U.S. Patent No. 2,859,459 to A. Stoll; this apparatus can be modified to indent opposite sides with punches of a construction to be described. Only portions of that apparatus have been shown and described here and further details can be obtained by reference to the above patent.

Looking now to FIGURES 1 and 2, the apparatus for indenting a hexagonal nut 10 is shown and is generally indicated by the numeral 12 and includes a collet member 14 which is slidably mounted within a collet sleeve 16. The collet 14 is constructed with a plurality of fingers 18 which are movably separated from each other by longitudinally extending slots 20 and which are connected at their rearwardmost ends by a continuous annular portion 22. The fingers 18 define a hexagonally shaped bore 24 at their forward ends, with each of the fingers 18 having a flat, nut engaging surface 26 for engaging the flats or flanks of the hexagonal nut 10. The forward end of the collet 14 abuts against a locking collar 28.

In operation nut blanks, such as nut 10, are fed into the bore 24 of the collet 14. The collet sleeve 16 is moved forward so that the frustro conically shaped bore portion 30 of collet sleeve 16 engages the forward radially outward frustro conically shaped surfaces of the fingers 18 of the collet 24. The relative approaching movement between the collet sleeve 16, and the locking collar 28 will cause the collet fingers 24 to move radially inwardly as permitted by the slots 20, etc. to grip the nut blank 10 within the bore 24 at the flat surfaces 26. A pair of punch assemblies 31 including punches 32 are located radially, diametrically oppositely relative to the bore 24 and are movable through opposite ones of a pair of the flat surfaces 26 in an opposite pair of the fingers 18. After the nut 10 has been thoroughly clamped by the fingers 18 of the collet 14, the punches 32 are actuated to move radially inwardly to indent the material generally at the top of the nut to form a nut construction generally shown in FIGURES 3 through 7. The punches 32 are formed to provide the indentations of the shape as shown in FIGURES 3 through 7. Because of the fact that the nut 10 is securely held with the flats 34 confined by the engaging surfaces 26 of the fingers 18 of the collet 14, upon permanent deformation to form the indentations in two of the flanks the others of the flanks 34 and the remaining portions of the two indented flanks 34 of the nut 10 will be substantially held from deformation; this results in an improved nut construction to be described.

Looking now to the drawings, FIGURES 3 through 7, the nut 10 being hexagonal in shape has six flats or flanks 34 with indentations 36 provided on a diametrically opposite pair of the flats 34. The nut 10 is provided with a threaded bore 38 and has a generally flat, annular surface 40 at its outer end and a generally conical surface 42 connecting the annular surface 40 to the flanks or flats 34. The cone portion 42 can extend generally at an angle of around 40° to 45°. The indentations 36 are located at the upper end of the opposite flats 34 with the upper end of the indentations 36 having an extent across the flats indicated by the dimension *a* which is a distance less than the total width of the flats 34; in the embodiment shown the dimension *a* is approximately between 70–90 percent of the width of the flat 34. By keeping the indentations 36 less than the width of and away from the corners of the flats 34 the tendency to move the entire surface of the flat 34 and to distort the corners and other flats is eliminated. The sides 44 of the indentation 36 taper generally inwardly toward each other and terminate at the lower extremity of the indentations 36 at a shoulder 46. The shoulder 46 extends for a dimension *y* which is less than approximately 66% and preferably between 50–60 percent of the width of the flat 34.

The distance *x* of the shoulder 46 from the surface 40 is approximately one half of the total nut height *z*. The surface of the indentation 36 (see FIGURE 7) tapers whereby it extends inwardly toward the center of the nut a greater extent at the top end proximate the conical portion 42 than at the lower end proximate the shoulder 46. As a result of the tapering of the surface of indentation 36, the threads in the bore 38 are deformed to the greatest extent at the uppermost end of the nut 10 while at the bottom 48 of the nut 10 substantially no deformation of the thread occurs.

The bottom 48 of the nut 10 (see FIGURE 6) has an annular bearing surface 50 formed thereon. Since the bearing surface 50 normally engages the surface of the workpiece being connected it is desirable that surface 50 be maintained as flat as possible to provide good bearing. By use of the form of the indentation 36, there is literally no deformation of the flats 34 at the bottom of the nut, i.e., the maximum deviation at the bottom of the nut across the flats 34 is less than .004"; with the flats 34 thus dimensionally held it follows that the bottom 48 of the nut 10 and the bearing surface 50 are maintained flat whereby good engagement is obtained with the surface of the workpiece being secured. Note that by tapering the indentations 36 radially and along the sides 44 the bottom portion of the nut 10 is substantially less sensitive to indentation variations occurring in the manufacturing process. In addition, the double taper provides for a smooth and gradual transition between the undeformed bore portion at the bottom of the nut 10 and the deformed portion at the top.

Because the flats 34 are generally not deformed save in the areas of the indentations 36 the deformation of the bore 38 is generally located at the areas in line with the indentations 36. Looking now to FIGURE 4, the bore 38 at 90° from the centers of the indentations 36 has diametrically opposed circular segments $b$ extending about 60° each and having a generally uniform radius $r$ substantially equal to that of the original undistorted nut and located generally at their original positions relative to the nut axis P. Connecting these generally undistorted segments $b$ are the opposed remaining segments $c$ which extend for approximately 120° each; each have a uniform radius R at least 50% greater than the original radius $r$. With other nut constructions having indentations at opposite sides, the segments corresponding to segments $b$ are moved radially outwardly. In the present construction the segments $b$ are not distorted providing for good thread contact. In addition, since the indentations 36 taper to the shoulder 46, the bottom 48 and hence the bearing surface 50 are undistorted.

With this construction the total nut height $z$ can be held at a minimum while still providing satisfactory torque characteristics. At least at some minimum portion at the bottom of the nut the distortion must be minimal to permit the nut to be started on the bolt, i.e. generally for the pitch of the thread. With other nut constructions the nut height must be greater because the degree of bore deformation along the axis of the nut is greater and hence the added height is required to provide a nut which is sufficiently undeformed at the bottom to permit initial threading onto a bolt. With the present method and construction the nut 10 can be of a lesser height $z$ and still have substantially no deformation at the bore 38 near the bottom 48 whereby the nut 10 can be readily started on a bolt.

Thus in the nut construction of the present invention, by utilizing the form of indentations 36 as described, has a bore 38 which even at the top where the indentations 36 are located, has undistorted portions $b$ to provide improved bearing between nut 10 and a mating bolt. In addition, the flats 34 are dimensionally unchanged whereby the corners are held intact to provide for excellent bearing with installation wrenches. Also by substantially not deforming the flats 34 the bottom 48 and bearing surface 50 are maintained flat thus providing good bearing with the surface of the part being fastened. Further, with the form of the indentations 46, the finally formed nut 10 is less sensitive to process variations, i.e., degree of indentation. Also with the form of the indentations 46, the nut height $z$ can be held to a minimum while still providing ample starting thread at the bottom 48 and still providing good torque retention characteristics.

While it will be apparent that the preferred embodiment of the invention disclosed is well calculated to fulfill the objects above stated, it will be appreciated that the invention is susceptible to modification, variation and change.

What is claimed is:

1. In a torque nut having six flats and a through, threaded bore, the improvement comprising: the nut having a top surface, a generally conical surface portion extending from said top to the flats, and a bottom bearing surface; at least a part of each of an opposed pair of flats having deformations in the form of radially inwardly extending indentations proximate the upper end of said opposed pair of flats; adjacent pairs of the flats defining substantially equal, included angles throughout the axial extent thereof; the bore being deformed radially inwardly proximate to said top and said upper end generally along said indentations and being undeformed from said bottom bearing surface for a height permitting the nut to be started on a mating bolt, said bottom bearing surface being substantially flat, the portions of said bore in quadrature with said indentations being undeformed at said top and at said upper end and being located a distance from the nut axis equal to the undeformed bore radius.

2. The nut of claim 1 with the deformed portions of the bore having an arc with a radius greater than the undeformed bore radius and located from the nut axis a distance less than the undeformed bore radius.

3. The nut of claim 2 with each said undeformed portions extending for approximately 60° and with each said deformed portions extending for approximately 120°.

4. The nut of claim 3 with each of said indentations located on one of said pair of flats and extending for a distance less than the width of said one of said pair of flats.

5. The nut of claim 4 with said indentations tapering radially inwardly along a line from said bottom to said top whereby the degree of deformation of said bore is greater at said upper end.

6. The nut of claim 5 with said indentations extending for approximately between 70–90% of the flat width at the upper end of said indentations.

7. The nut of claim 6 with said indentations extending for less than 66% of the flat width at the lower end of said indentations.

8. The nut of claim 7 with said indentations extending for approximately between 50–66% of the flat width.

9. The nut of claim 10 with the lower end of said indentations being located at approximately 50% of the total height of the nut.

10. In a torque nut having an even numbered plurality of flats and a through, threaded bore, the improvement comprising: the nut having a top surface, a generally conical surface portion extending from said top to the flats, and a bottom bearing surface; at least a part of each of an opposed pair of flats having deformations in the form of radially inwardly extending indentations proximate the upper end of said opposed pair of flats; each of the adjacent pair of flats defining substantially equal include angles throughout the axial extent thereof; the threaded bore being deformed radially inwardly proximate to said top and said upper end generally along said indentations and being undeformed from said bottom bearing surface for a height permitting the nut to be started on a mating bolt, the portions of said bore in quadrature with said indentations being undeformed at said top and at said upper end and being located a distance from the nut axis equal to the undeformed bore radius.

11. The nut of claim 10 with said bottom bearing surface being an annular surface defining a substantially undeformed circle about the nut axis.

12. The nut of claim 10 with said indentations tapering radially inwardly along a line from said bottom to said top whereby the degree of deformation of said bore is greater at said upper end.

13. The nut of claim 10 with the deformed portions of the bore having an arc with a radius greater than the undeformed bore radius and located from the nut axis a distance less than the undeformed bore radius.

14. The nut of claim 13 with each said undeformed portions extending for approximately 60° and with each said deformed portions extending for approximately 120°.

15. The nut of claim 14 with each of said indentations located on one of said pair of flats and extending for a distance less than the width of said one of said pair of flats.

References Cited

UNITED STATES PATENTS

| | | |
|---|---|---|
| 3,340,920 | 9/1967 | Johnson. |
| 3,198,230 | 8/1965 | Stover. |

FOREIGN PATENTS

| | | |
|---|---|---|
| 10,396 | 8/1886 | Great Britain. |
| 546,320 | 7/1942 | Great Britain. |

RAMON S. BRITTS, Primary Examiner

U.S. Cl. X.R.

10—86

PO-1050
(5/69)

UNITED STATES PATENT OFFICE
CERTIFICATE OF CORRECTION

Patent No. 3,455,361            Dated July 15, 1969

Inventor(s) Donald R. Zimmer and Ulrich W. Stoll

It is certified that error appears in the above-identified patent and that said Letters Patent are hereby corrected as shown below:

Column 4, line 62, delete "clude" and substitute therefor --cluded--.

Claim 9, line 1, delete "10" and substitute therefor --8--.

SIGNED AND
SEALED

NOV 18 1969

(SEAL)
Attest:

Edward M. Fletcher, Jr.
Attesting Officer

WILLIAM E. SCHUYLER, JR.
Commissioner of Patents